United States Patent
Crisp et al.

(10) Patent No.: US 10,871,119 B2
(45) Date of Patent: Dec. 22, 2020

(54) MOTOR VEHICLE HAVING ACTIVE SHUFFLE REDUCTION

(71) Applicant: Ford Global Technologies, LLC, Dearborn, MI (US)

(72) Inventors: Nicholas Dashwood Crisp, Benfleet (GB); Michael Rowland, Wickham Bishops (GB); Martin Jansz, Malvern East (AU)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 16/270,455

(22) Filed: Feb. 7, 2019

(65) Prior Publication Data
US 2019/0249617 A1 Aug. 15, 2019

(30) Foreign Application Priority Data
Feb. 13, 2018 (GB) .................................. 1802298.8

(51) Int. Cl.
*F02D 41/14* (2006.01)
*B60W 30/20* (2006.01)
(Continued)

(52) U.S. Cl.
CPC .......... *F02D 41/1498* (2013.01); *B60K 6/485* (2013.01); *B60W 10/06* (2013.01);
(Continued)

(58) Field of Classification Search
CPC ............. F02D 41/1498; F02D 41/0097; F02D 2041/1432; F02D 2200/1012;
(Continued)

(56) References Cited

U.S. PATENT DOCUMENTS

| 6,718,943 B1 | 4/2004 | De La Salle et al. |
| 7,017,692 B2 | 3/2006 | Grassl et al. |

(Continued)

FOREIGN PATENT DOCUMENTS

| EP | 1077150 A2 | 2/2001 |
| GB | 2416863 A | 2/2006 |

(Continued)

OTHER PUBLICATIONS

Great Britain Intellectual Property Office, Combined Search and Examination Report under Sections 17 and 18(3) Issued in Application No. GB1802298.8, dated Aug. 14, 2018, 5 pages.

*Primary Examiner* — Joseph J Dallo
*Assistant Examiner* — Yi-Kai Wang
(74) *Attorney, Agent, or Firm* — David Kelley; McCoy Russell LLP

(57) ABSTRACT

A motor vehicle is disclosed having an internal combustion engine and an integrated starter-generator drivingly connected to a crankshaft of the internal combustion engine by a belt drive. Operation of the internal combustion engine and the integrated starter-generator is controlled by an electronic controller in response to a number of inputs. The electronic controller is arranged to use the internal combustion engine and the integrated starter-generator to actively reduce driveline shuffle in one of a number of shuffle reduction modes that are selected by the electronic controller based on at least the current rotational speed of the internal combustion engine.

17 Claims, 8 Drawing Sheets

| | Engine Speed (N) | Control Methodology |
|---|---|---|
| 402 | N < N1 | ISG only for shuffle damping |
| 404 | N1 < N < N2 | Shuffle damping using engine positive torque and ISG negative torque |
| 406 | N > N2 | Shuffle damping using engine supplemented by ISG braking |

(51) Int. Cl.
*B60K 6/485* (2007.10)
*B60W 20/15* (2016.01)
*B60W 10/08* (2006.01)
*B60W 10/06* (2006.01)
*F02D 41/00* (2006.01)
*F02P 5/15* (2006.01)
*B60W 50/00* (2006.01)

(52) U.S. Cl.
CPC ............ *B60W 10/08* (2013.01); *B60W 20/15* (2016.01); *B60W 30/20* (2013.01); *F02D 41/0097* (2013.01); *F02P 5/1504* (2013.01); B60W 2030/206 (2013.01); B60W 2050/0057 (2013.01); B60W 2510/0638 (2013.01); B60W 2510/0652 (2013.01); B60W 2710/0666 (2013.01); B60W 2710/083 (2013.01); *F02D 2041/1432* (2013.01); F02D 2200/1012 (2013.01); F02D 2250/21 (2013.01)

(58) Field of Classification Search
CPC ... F02D 2250/21; B60W 20/15; B60W 10/08; B60W 30/20; B60W 2030/206; B60W 2050/0057; B60W 2510/0638; B60W 2510/0652; B60W 2710/0666; B60W 2710/083; B60K 6/485; F02P 5/1504
USPC ......................................................... 701/111
See application file for complete search history.

(56) References Cited

U.S. PATENT DOCUMENTS

| | | |
|---|---|---|
| 9,481,360 B1 | 11/2016 | Gibson et al. |
| 2004/0035618 A1 | 2/2004 | Grassl et al. |
| 2005/0090365 A1* | 4/2005 | Tamai ................... B60K 6/543 |
| | | 477/5 |
| 2006/0030979 A1 | 2/2006 | Kuang et al. |
| 2008/0060614 A1* | 3/2008 | Hanamura ............. F02D 41/10 |
| | | 123/403 |
| 2017/0166186 A1* | 6/2017 | Kim ...................... B60W 10/08 |

FOREIGN PATENT DOCUMENTS

| | | |
|---|---|---|
| JP | 2013256269 A | 12/2013 |
| JP | WO2015159724 A1 | 10/2015 |

* cited by examiner

MOTOR VEHICLE HAVING ACTIVE SHUFFLE REDUCTION

CROSS REFERENCE TO RELATED APPLICATION

The present application claims priority to Great Britain Patent Application No. 1802298.8, filed Feb. 13, 2018. The entire contents of the above-listed application are hereby incorporated by reference for all purposes.

FIELD

The present description relates generally to motor vehicles having an internal combustion engine driving a driveline and in particular to the use of an integrated electric starter-generator to assist with attenuation of driveline shuffle.

BACKGROUND/SUMMARY

A driveline of a motor vehicle is a lightly damped system that is prone to oscillation, particularly in the case of a throttle "tip-in" or a throttle "tip-out" event, which often result in torsional impulses being transferred to the driveline. One such mode of oscillation is often referred to as "driveline shuffle" and is related to the natural frequency of the driveline. Driveline shuffle typically occurs in a range of 1 to 10 Hz depending upon the selected gear and the torsional stiffness of the various components making up the driveline. If not controlled, driveline shuffle may reduce vehicle drivability and/or reduce a repeatability of the drivability response.

Other attempts to address driveline shuffle include systems and methods for managing torque rise and fall rates into the driveline. One example approach is shown by De La Salle et al. in U.S. Pat. No. 6,718,943. Therein, the operation of an engine of a motor vehicle is adjusted in order to reduce the magnitude of such driveline shuffle, such as by using active closed-loop torque control based on detected oscillations in an engine speed signal.

However, the inventors herein have recognized potential issues with such systems. As one example, the engine is operated inefficiently to reduce the driveline oscillations, resulting in engine performance degradation. As another example, at very low engine speeds, the engine is often too slow in response to effectively compensate for the oscillatory nature of the driveline shuffle. As a result, decreased vehicle drivability may still occur at low engine speeds.

In one example, the issues described above may be addressed by a system for a motor vehicle, comprising: an engine driving a multi-speed transmission; an integrated starter-generator driveably connected to a crankshaft of the engine; and an electronic controller storing executable instructions in non-transitory memory, that, when executed, cause the electronic controller to: select a shuffle reduction mode from a plurality of shuffle reduction modes based at least partly on a rotational speed of the crankshaft of the engine; and operate the engine and the integrated starter-generator in the selected shuffle reduction mode. In this way, driveline shuffle is reduced even at low engine speeds through the use of the integrated starter-generator, thereby increasing vehicle drivability at low engine speeds and increasing engine efficiency.

As one example, when a first shuffle reduction mode is selected by the electronic controller, operating the engine and the integrated starter-generator in the selected shuffle reduction mode may include using only the integrated starter-generator to reduce driveline shuffle. As another example, when a second shuffle reduction mode is selected by the electronic controller, operating the engine and the integrated starter-generator in the selected shuffle reduction mode may include using the engine and the integrated starter-generator in combination to reduce driveline shuffle. As still another example, when a third shuffle reduction mode is selected by the electronic controller, operating the engine and the integrated starter-generator in the selected shuffle reduction mode may include using the engine as the primary means for reducing driveline shuffle and using the integrated starter-generator to supplement the effect of the engine when the engine is operating to reduce the speed of the crankshaft. As an example, the controller may select the first shuffle reduction mode when the rotational speed of the crankshaft is less than a first, lower speed threshold, select the second shuffle reduction mode when the rotational speed of the crankshaft is greater than the first speed threshold and less than a second, higher speed threshold, and select the third shuffle reduction mode when the rotational speed of the crankshaft is greater than the second speed threshold. As an alternative example, the controller may select the first shuffle reduction mode when the rotational speed of the crankshaft is less than a speed threshold and a frequency of the driveline shuffle is less than a frequency threshold, select the second shuffle reduction mode when the rotational speed of the crankshaft is less than the speed threshold and the frequency of the driveline shuffle is greater than the frequency threshold, and select the third shuffle reduction mode when the rotational speed of the crankshaft is greater than the speed threshold. In this way, inefficient operation of the engine to for driveline shuffle control is reduced while vehicle drivability is increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
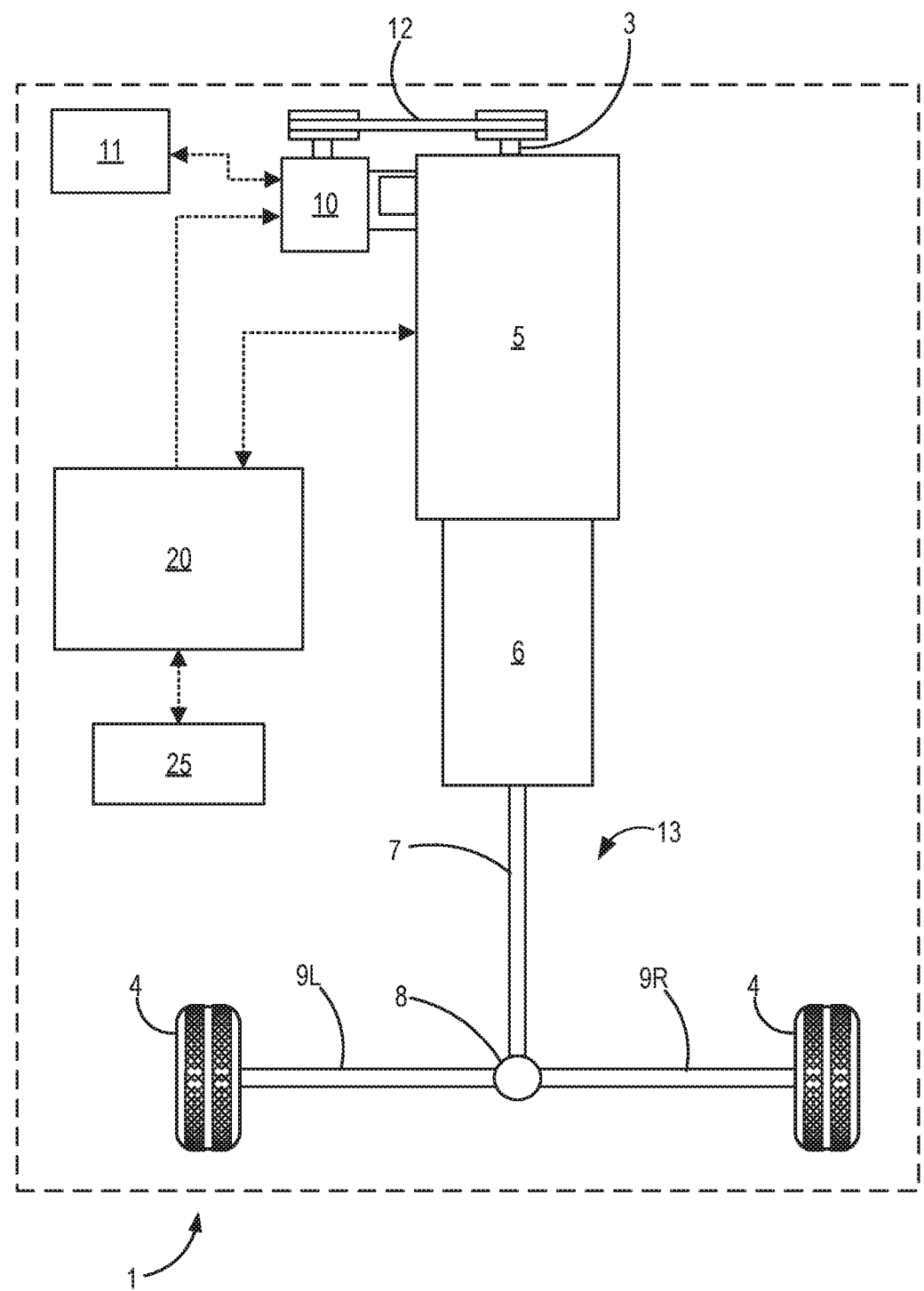
FIG. 1A is a schematic drawing of a motor vehicle constructed in accordance with a first aspect of the present disclosure, having an internal combustion engine and an integrated starter-generator used to reduce driveline shuffle.
Figure 1B:
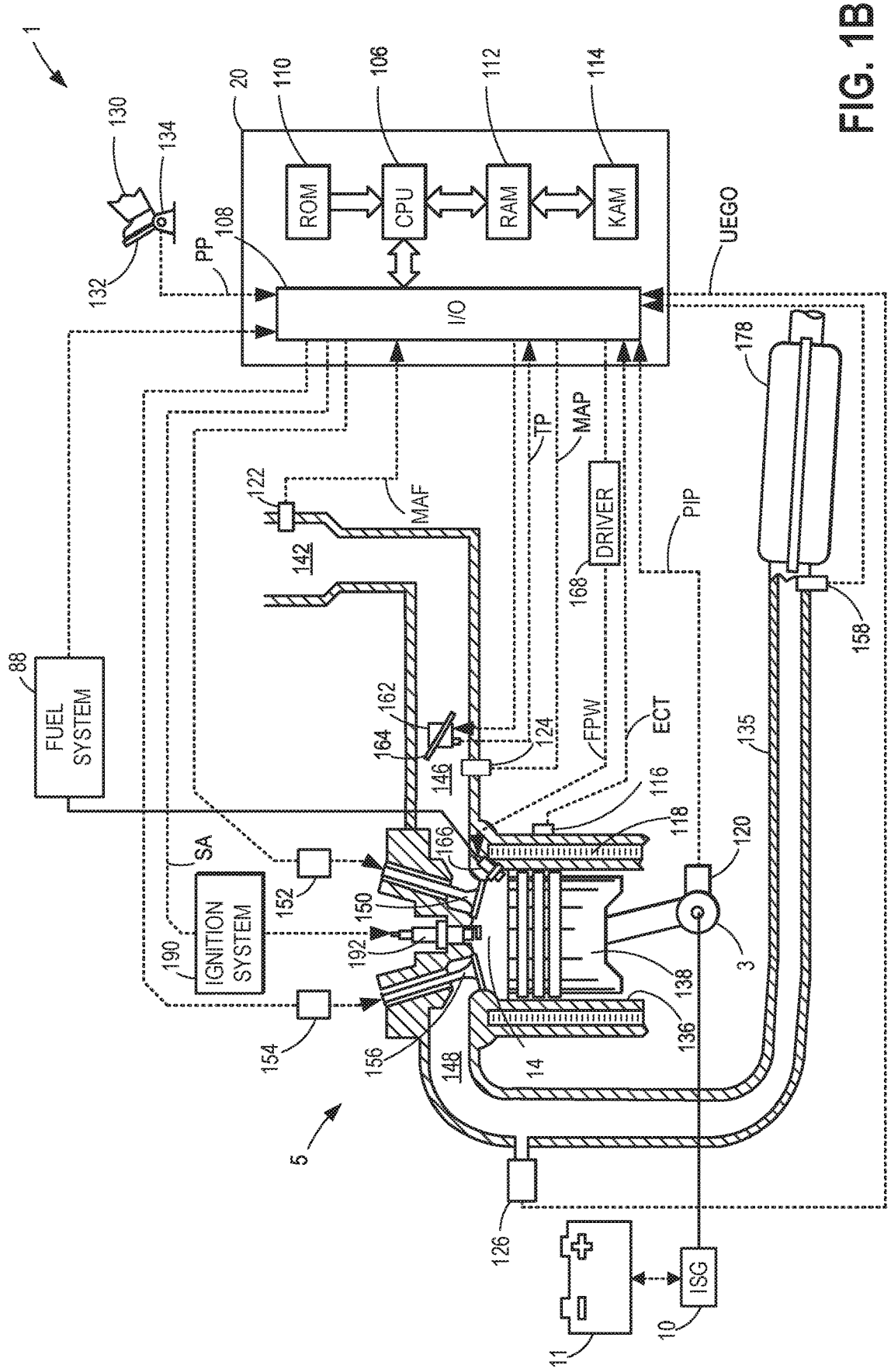
FIG. 1B is a schematic drawing of an example engine system included in the motor vehicle of FIG. 1A.
Figure 5:
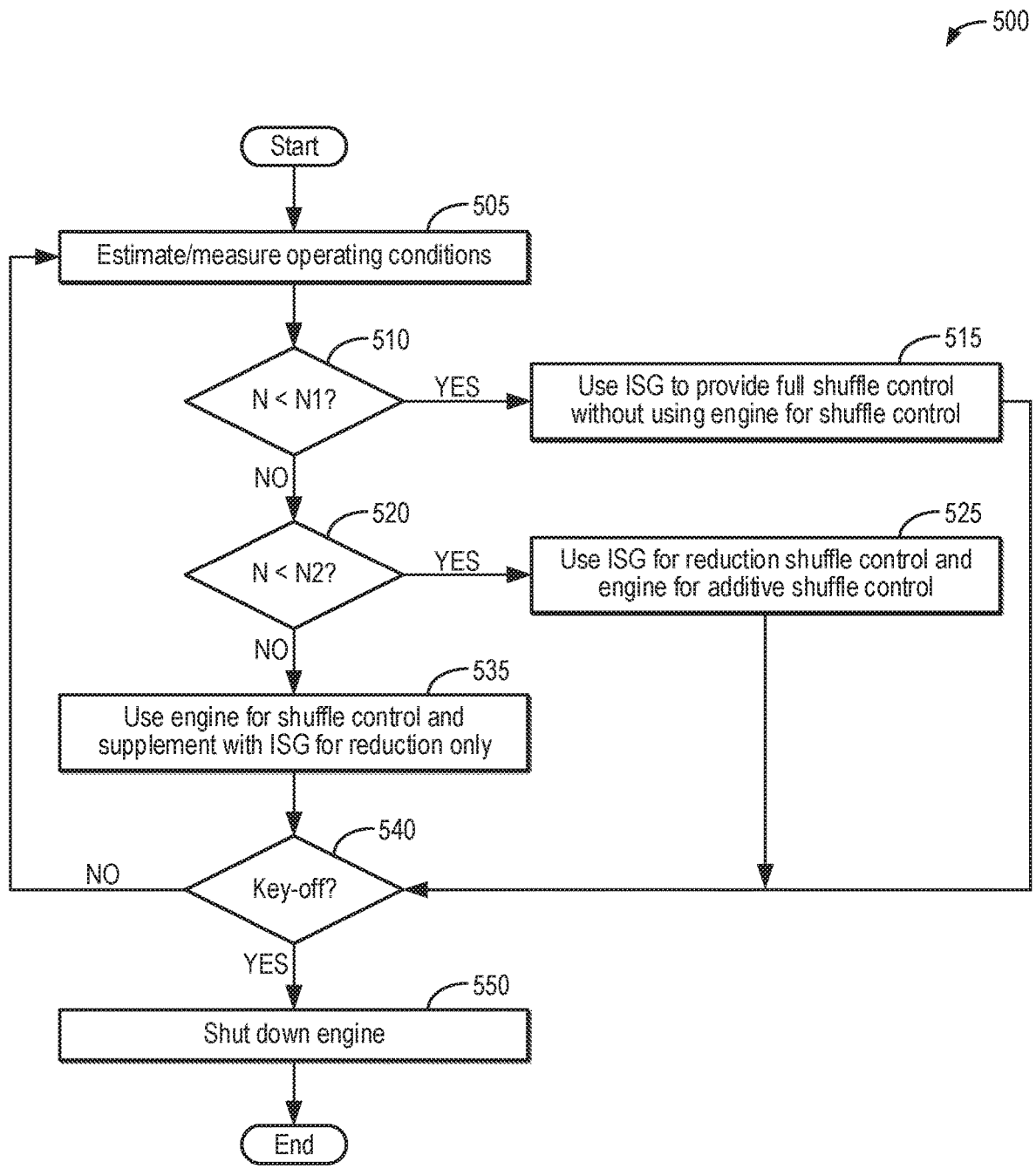
FIG. 5 is a high level flowchart of a first embodiment of a method for reducing driveline shuffle in accordance with a second aspect of the present disclosure.
Figure 6:
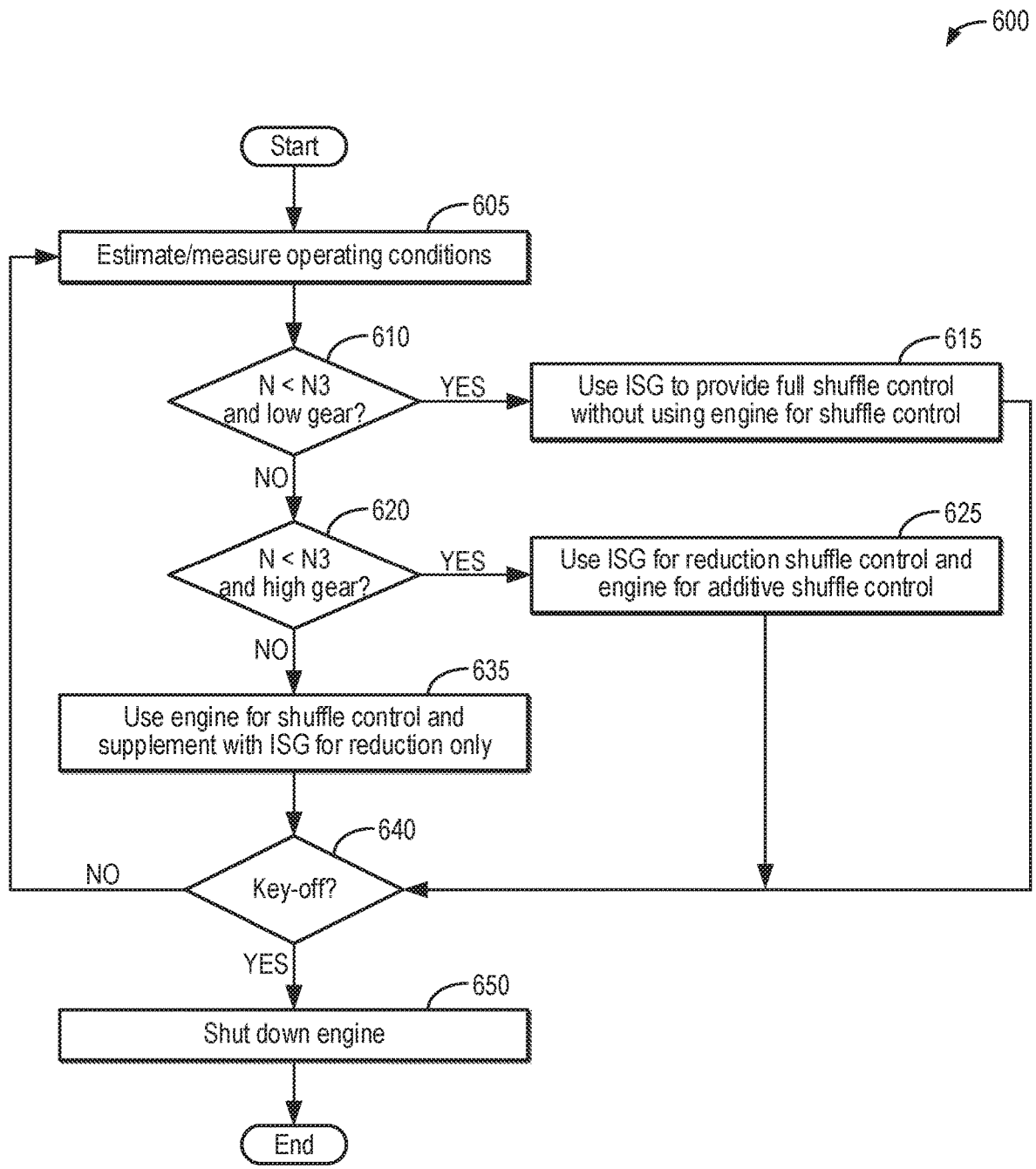
FIG. 6 is a high level flowchart of a second embodiment of a method for reducing driveline shuffle in accordance with the second aspect of the present disclosure.
Figure 7:
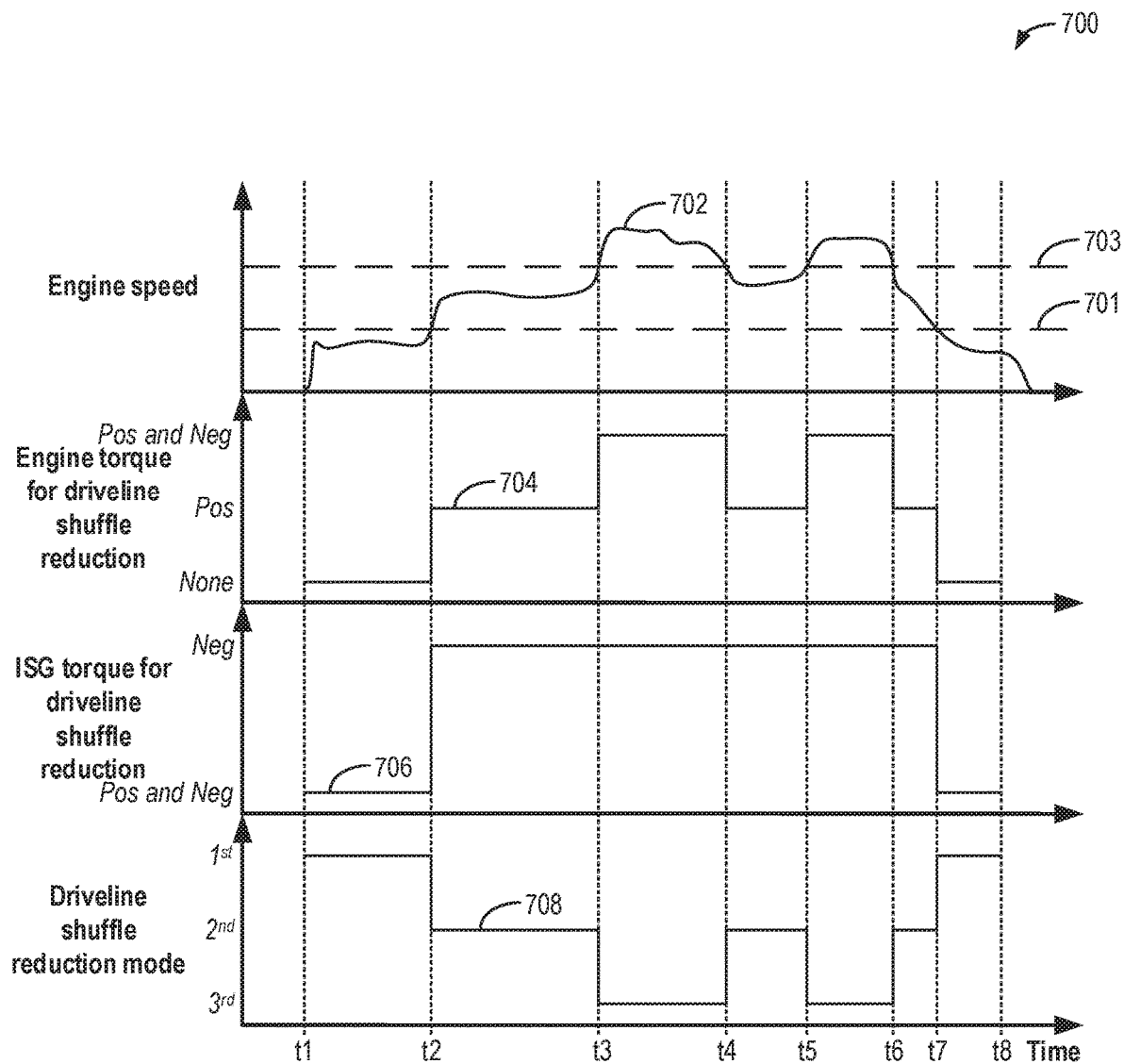
FIG. 7 is a prophetic example timeline for adjusting engine and integrated starter-generator operation to reduce driveline shuffle based on engine speed.

The following description relates to systems and methods for controlling driveline shuffle in a motor vehicle including an integrated starter-generator (ISG), such as the motor vehicle shown in FIGS. 1A and 1B. As shown in the example graph of FIG. 2, the ISG may be effective at applying relatively high positive torque and relatively high negative torque for reducing driveline shuffle at low engine speeds, but may be ineffective at higher engine speeds, particularly for applying positive torque. Therefore, a vehicle controller may employ various control methodologies to reduce driveline shuffle using torque from the ISG, torque from the engine, or both based on at least engine speed in order to provide effective driveline shuffle control that is also optimized for engine efficiency. A first example control methodology is summarized in FIG. 4A, and the corresponding method is shown in FIG. 5. A second example control methodology is summarized in FIG. 4B, and the corresponding method is shown in FIG. 6. The torque effects of using the example control methodologies are illustrated in FIGS. 3A-3C. An example timeline for adjusting operation of the ISG and the engine for driveline shuffle control based on engine speed is shown in FIG. 7.

According to a first aspect of the present disclosure, there is provided a motor vehicle having an internal combustion engine driving a multi-speed transmission, an integrated starter-generator driveably connected to a crankshaft of the internal combustion engine, and an electronic controller to control the operation of the internal combustion engine and the integrated starter-generator, the electronic controller being operable to control use of the internal combustion engine and the integrated starter-generator in a number of shuffle reduction modes wherein the electronic controller is arranged to select the shuffle reduction mode to be used based at least partly on a rotational speed of the crankshaft of the combustion engine.

When a first shuffle reduction mode is selected by the electronic controller, the electronic controller may be operable to use only the integrated starter-generator to reduce driveline shuffle. When there is a need to increase the rotational speed of the crankshaft to reduce driveline shuffle, the electronic controller may be arranged to use the integrated starter-generator to apply a positive torque to the crankshaft of the engine. When there is a need to reduce the rotational speed of the crankshaft to reduce driveline shuffle, the electronic controller may be arranged to use the integrated starter-generator to apply a negative, braking torque to the crankshaft of the engine. As one example, the electronic controller may be operable to only use the first shuffle reduction mode when the rotational speed of the crankshaft is below a first predefined low speed threshold. As another example, the electronic controller may be operable to only use the first shuffle reduction mode when the rotational speed of the crankshaft is below a predefined speed threshold and a driveline shuffle frequency is below a predefined shuffle frequency threshold.

When a second shuffle reduction mode is selected by the electronic controller, the electronic controller may be operable to use the internal combustion engine and the integrated starter-generator in combination to reduce driveline shuffle. The integrated starter-generator may be used to reduce driveline shuffle by applying a negative braking torque to the crankshaft to reduce the rotational speed of the crankshaft, and the internal combustion engine may be used to increase the rotational speed of the crankshaft. As one example, the electronic controller may be operable to use the second shuffle mode when the rotational speed of the crankshaft is above the first predefined low speed threshold and below a second higher speed threshold. As another example, the electronic controller may be operable to use the second shuffle mode when the rotational speed of the crankshaft is below the predefined speed threshold and a shuffle frequency of the driveline is above the shuffle frequency threshold.

When a third shuffle reduction mode is selected by the electronic controller, the electronic controller may be operable to use the internal combustion engine as the primary means for increasing and reducing the rotational speed of the crankshaft to reduce driveline shuffle and use the integrated starter-generator to supplement the effect of the internal combustion engine when the internal combustion engine is operating to reduce the speed of the crankshaft by applying additional negative braking torque to the crankshaft of the engine. As one example, the electronic controller may be operable to use the third shuffle reduction mode when the rotational speed of the internal combustion engine is above the second predefined speed threshold. As another example, the electronic controller may be operable to use the third shuffle reduction mode when the rotational speed of the combustion engine is above the predefined speed threshold.

According to a second aspect of the present disclosure, there is provided a method of reducing motor vehicle driveline shuffle comprising: in a first engine rotational speed-dependent shuffle reduction mode, utilizing only an integrated starter-generator driveably connected to a crankshaft of an internal combustion engine of the motor vehicle to reduce driveline shuffle; in a second engine rotational speed-dependent shuffle reduction mode, utilizing the internal combustion engine and the integrated starter-generator in combination to reduce driveline shuffle by using the integrated starter-generator to apply a negative braking torque to the crankshaft when there is a need to reduce the rotational speed of the crankshaft and by using the internal combustion engine to increase the rotational speed of the crankshaft when there is a need to increase the rotational speed of the crankshaft; and, in a third engine rotational speed-dependent shuffle reduction mode, utilizing the internal combustion engine as the primary means for increasing and reducing the rotational speed of the crankshaft so as to reduce driveline shuffle when the rotational speed of the crankshaft is above the second predefined speed threshold and use the integrated starter-generator to supplement the internal combustion engine by applying additional negative braking torque to the crankshaft of the engine when there is a need to reduce the rotational speed of the crankshaft. The method may further comprise using the first engine rotational speed-dependent shuffle reduction mode when the rotational speed of the crankshaft is below a first predefined speed threshold; using the second engine rotational speed-dependent shuffle reduction mode when the rotational speed of the crankshaft is below a second predefined speed threshold that is higher than the first predefined low speed threshold; and using the third engine rotational speed-dependent shuffle reduction mode when the rotational speed of the crankshaft is above the second predefined speed threshold.

Alternatively, the method may further comprise using the first engine rotational speed-dependent shuffle reduction mode when the rotational speed of the crankshaft is below a predefined speed threshold and a driveline shuffle frequency is below a shuffle frequency limit; using the second engine rotational speed-dependent shuffle reduction mode when the rotational speed of the crankshaft is below the predefined speed threshold and the driveline shuffle frequency is above the shuffle frequency limit; and using the third engine rotational speed-dependent shuffle reduction mode when the rotational speed of the crankshaft is above the predefined speed threshold. The driveline frequency may be dependent upon a gear ratio selected in a multi-speed transmission driven by the internal combustion engine. When the rotational speed of the engine is at the predefined speed threshold and a low gear is selected in the transmission, the driveline shuffle frequency may not be higher than the shuffle frequency limit. When the rotational speed of the engine is at the predefined speed threshold and a high gear is selected in the transmission, the driveline shuffle frequency may be above the shuffle frequency limit.

Turning now to the figures, FIG. 1A shows a motor vehicle 1 having an internal combustion engine 5 driving a manual multi-speed transmission 6. In the example of FIG. 1A, the transmission 6 provides a driving torque to a pair of road wheels 4 via a driveline 13 including a propeller shaft 7, a differential 8, and a pair of half shafts 9L and 9R. Although the example depicted in FIG. 1A shows vehicle 1 as a two-wheel rear drive vehicle, it will be appreciated that the disclosure herein is not limited to a two-wheel rear drive vehicle and can be applied to other driveline arrangements such as, for example, all-wheel drive and front wheel drive.

An electric motor-generator in the form of an integrated starter-generator (ISG) 10 is drivingly connected to a crankshaft 3 of the engine 5 by a belt drive 12. In the example shown in FIG. 1A, ISG 10 and the belt drive 12 are included in a front end accessory drive, and the ISG 10 is a belt-integrated starter-generator (BISG). Further, the ISG 10 is shown operatively connected to a 42 volt battery 11, making ISG 10 a 42 volt BISG in the illustrated example. When the ISG 10 is operating as a motor to apply a positive torque to the crankshaft 3, electrical energy is drawn from the battery 11, and a state of charge of the battery 11 is reduced. Conversely, when the ISG 10 is operating as a generator to apply a negative torque to the crankshaft 3, electrical energy is supplied to the battery 11, and the state of charge of the battery 11 is increased.

An electronic controller 20 is provided to control the operation of the ISG 10 and the engine 5 based on information received from a number of sensor inputs 25, examples of which will be described below with respect to FIG. 1B. As will be elaborated below with respect to FIGS. 4A-6, the controller 20 may employ a control methodology to control the operation of the ISG 10 and the engine 5 to reduce driveline shuffle in a fuel efficient manner. It will be appreciated that the controller 20 may be a single unit, as illustrated, or may comprise a number of separate electronic controllers or control units that are operationally linked to provide the desired functionality.

Next, FIG. 1B depicts an example of a cylinder 14 of internal combustion engine 5 included in vehicle 1. Engine 5 may be controlled at least partially by a control system, including controller 20, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 5 may include combustion chamber walls 136 with a piston 138 positioned therein. Piston 138 may be coupled to crankshaft 3 so that reciprocating motion of the piston is translated into rotational motion of the crankshaft. As used herein, the phrases "rotating the engine" and "spinning the engine" refer to crankshaft 3 rotating about its central axis. As shown in FIG. 1A, crankshaft 3 may be coupled to at least one road wheel 4 via transmission 6, as further described above, as well as ISG 10 via belt 12.

In some examples, vehicle 1 may be a hybrid vehicle with multiple sources of torque available to one or more road wheels. In the example shown in FIGS. 1A and 1B, vehicle 1 includes engine 5 and ISG 10. In electric vehicle embodiments, a battery 11 may be a traction battery that delivers electrical power to ISG 10 to provide torque to the road wheels. In some examples, ISG 10 may also be operated as a generator to provide electrical power to charge battery 11, for example, during a braking operation.

Cylinder 14 of engine 5 can receive intake air via an intake passage 142 and an intake manifold 146. Intake manifold 146 can communicate with other cylinders of engine 5 in addition to cylinder 14. A throttle 162 including a throttle plate 164 may be provided in intake passage 142 for varying the flow rate and/or pressure of intake air provided to the engine cylinders.

An exhaust manifold 148 can receive exhaust gases from other cylinders of engine 5 in addition to cylinder 14. An exhaust gas sensor 126 is shown coupled to exhaust manifold 148 upstream of an emission control device 178 in an exhaust passage 135. Exhaust gas sensor 126 may be selected from among various suitable sensors for providing an indication of an exhaust gas air/fuel ratio (AFR), such as a linear oxygen sensor or UEGO (universal or wide-range exhaust gas oxygen) sensor, a two-state oxygen sensor or EGO sensor, a HEGO (heated EGO) sensor, a NOx sensor, a HC sensor, or a CO sensor, for example. In the example of FIG. 1B, exhaust gas sensor 126 is a UEGO sensor. Emission control device 178 may be a three-way catalyst, a NOx trap, various other emission control devices, or combinations thereof. In the example of FIG. 1B, emission control device 178 is a three-way catalyst.

Each cylinder of engine 5 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 5, including cylinder 14, may include at least two intake poppet valves and at least two exhaust poppet valves located at an upper region of the cylinder. Intake valve 150 may be controlled by controller 20 via an actuator 152. Similarly, exhaust valve 156 may be controlled by controller 20 via an actuator 154. The positions of intake valve 150 and exhaust valve 156 may be determined by respective valve position sensors (not shown).

During some conditions, controller 20 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 20 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

Each cylinder of engine 5 may include a spark plug 192 for initiating combustion. An ignition system 190 can provide an ignition spark to combustion chamber 14 via spark plug 192 in response to a spark advance signal SA from controller 20, under select operating modes. A timing of signal SA may be adjusted based on engine operating conditions and driver torque demand. For example, spark may be provided at or near maximum brake torque (MBT) timing to maximize engine power and efficiency. Alternatively, spark may be provided at a timing that is retarded from MBT to create a torque reserve. Controller 20 may input engine operating conditions, including engine speed and engine load, into a look-up table and output the corresponding spark timing for the input engine operating conditions, for example.

In some examples, each cylinder of engine 5 may be configured with one or more fuel injectors for providing fuel thereto. As a non-limiting example, cylinder 14 is shown including a fuel injector 166. Fuel injector 166 may be configured to deliver fuel received from a fuel system 88. Fuel system 88 may include one or more fuel tanks, fuel pumps, and fuel rails. Fuel injector 166 is shown coupled directly to cylinder 14 for injecting fuel directly therein in proportion to a pulse width of a signal FPW received from controller 20 via an electronic driver 168. In this manner, fuel injector 166 provides what is known as direct injection (hereafter also referred to as "DI") of fuel into cylinder 14. While FIG. 1B shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 88 via a high pressure fuel pump and a fuel rail. Further, the fuel tank may have a pressure transducer providing a signal to controller 20.

In an alternative example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 88 in varying relative amounts as a fuel mixture and further configured to inject this fuel mixture directly into cylinder. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, the intake stroke, or any appropriate combination thereof in what is referred to as split fuel injection.

Fuel tanks in fuel system 88 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 20 is shown in FIG. 1B as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 20 may receive various signals from sensors coupled to engine 5, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a profile ignition pickup signal (PIP) from a Hall effect sensor 120 (or other type) coupled to crankshaft 3; a throttle position (TP) from a throttle position sensor coupled to throttle 162; signal UEGO from exhaust gas sensor 126, which may be used by controller 20 to determine the AFR of the exhaust gas; and an absolute manifold pressure signal (MAP) from a MAP sensor 124. An engine speed signal, RPM, may be generated by controller 20 from signal PIP. The manifold pressure signal MAP from MAP sensor 124 may be used to provide an indication of vacuum or pressure in the intake manifold. Controller 20 may infer an engine temperature based on the engine coolant temperature and infer a temperature of emission control device 178 based on the signal received from temperature sensor 158.

As described above, FIG. 1B shows only one cylinder of a multi-cylinder engine. As such, each cylinder may similarly include its own set of intake/exhaust valves, fuel injector(s), spark plug, etc. It will be appreciated that engine 5 may include any suitable number of cylinders, including 2, 3, 4, 5, 6, 8, 10, 12, or more cylinders. Further, each of these cylinders can include some or all of the various components described and depicted by FIG. 1B with reference to cylinder 14. As one example, when engine 5 is a diesel engine and fuel system 88 supplies diesel fuel, spark plug 192 may not be included.

Figure 2:
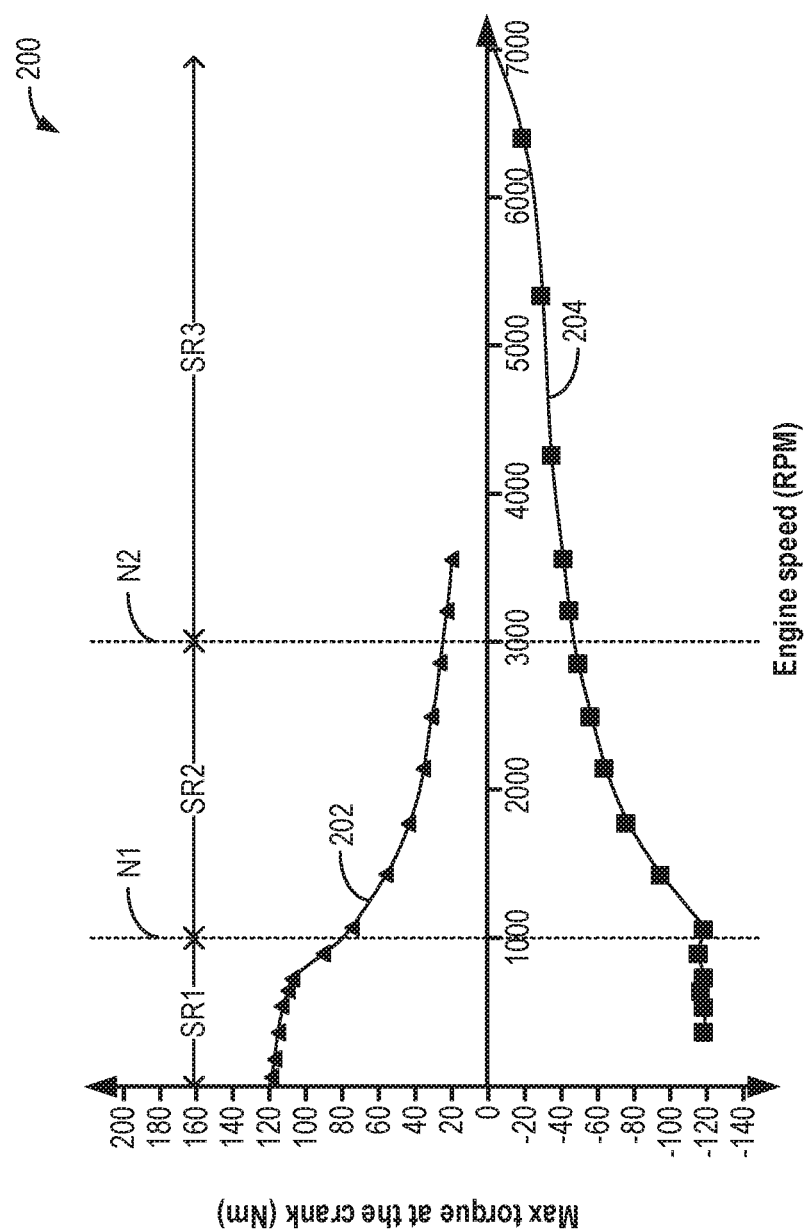
FIG. 2 is a graph showing a relationship between the maximum torque applied at a crankshaft of a combustion engine by an integrated starter-generator with respect to variations crankshaft speed.
Figure 3A:
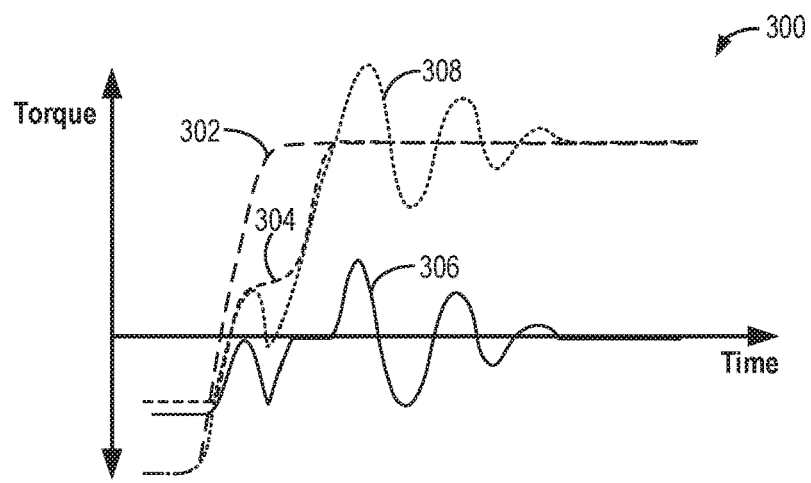
FIGS. 3A-3C are schematic graphs showing the effect of applying a control methodology shown in FIG. 4A to the motor vehicle shown in FIG. 1.
Figure 3B:
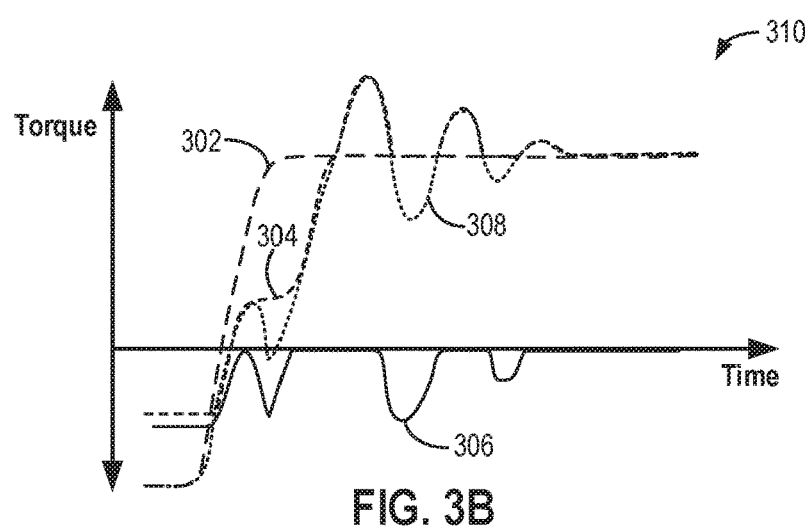
Figure 3C:
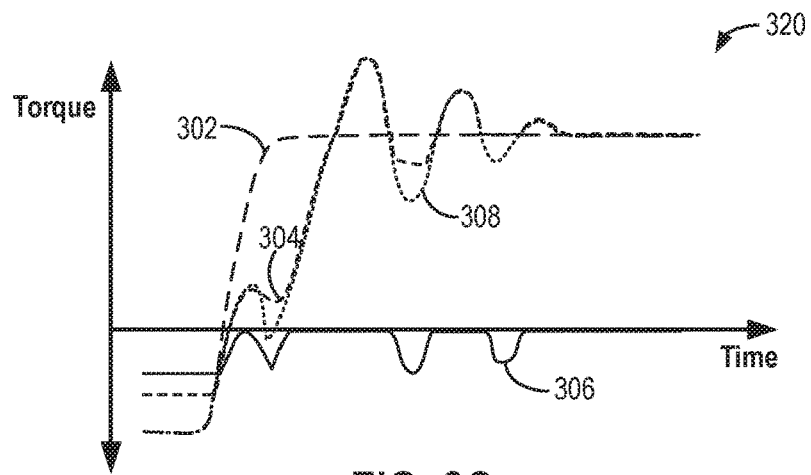

Next, FIG. 2 shows a graph 200 illustrating example relationships between a maximum torque at a crankshaft of an engine (e.g., crankshaft 3 of engine 5 shown in FIGS. 1A and 1B) that can be provided by an ISG (e.g., ISG 10 of FIGS. 1A and 1B) versus engine speed (e.g., crankshaft rotational speed). Two relationships are shown, including a first relationship 202 and a second relationship 204. The first relationship 202 shows the maximum amount of positive torque that can be supplied by the ISG to the crankshaft versus engine speed. The second relationship 204 shows the maximum amount of negative (braking) torque that can be supplied by the ISG to the crankshaft versus engine speed. The vertical axis of graph 200 shows maximum torque at the crankshaft (e.g., in Nm), and the horizontal axis of graph 200 shows engine speed (e.g., in RPM)

In both the first relationship 202 and the second relationship 204, a magnitude of the torque from the ISG, irrespective of whether it is positive or negative, rapidly decreases as the rotational speed of the engine increases above approximately 1000 RPM. In the example shown in FIG. 2, the ISG is unable to provide significant positive torque above an engine speed of approximately 3500 RPM, as illustrated by the first relationship 202, but is still able to provide a low level of negative (braking) torque above 3500 RPM, as illustrated by the second relationship 204. However, above 3500 RPM, the magnitude of negative torque available from the ISG continues to decrease, as shown in the second relationship 204.

In the example of graph 200 of FIG. 2, three distinct speed ranges can be defined: a first speed range (SR1), a second speed range (SR2), and a third speed range (SR3). The first speed range is defined by a first predefined speed threshold N1 set to approximately 1000 RPM, the first threshold N1 forming an upper boundary for the first speed range. Therefore, the first speed range encompasses engine speeds (N) less than approximately 1000 RPM. In the first speed range, the ISG is able to contribute positive (the first relationship 202) and negative torque (the second relationship 204) to reduce driveline shuffle. Therefore, if N is less than N1, the ISG will be able to contribute significantly to the reduction of driveline shuffle. Further, at such low rotational speeds (e.g., less than the first speed threshold N1), the engine is unable to significantly contribute to the reduction of driveline shuffle, and so full authority for shuffle reduction can be given to the ISG when the engine is operating in the first speed range SR1.

The second speed range is defined by the first speed threshold N1 as the lower boundary and a second predefined speed threshold N2 as the upper boundary, the second threshold N2 set to approximately 3000 RPM. Therefore, the second speed range encompasses engine speeds from approximately 1000 RPM to approximately 3000 RPM. In the second speed range, the ISG can contribute significantly to providing negative torque (the second relationship 204) and can provide some positive torque (the first relationship 202), particularly at the lower end of this speed range. Therefore, if N is greater than N1 and less than N2, the ISG will be able to contribute significantly to the reduction of driveline shuffle by supplying negative torque to the crankshaft of the engine. Further, in the second speed range, the engine is able to significantly contribute to the reduction of driveline shuffle, but it is inefficient to use the engine to slow the crankshaft (e.g., such as by retarding spark timing). Therefore, in the second speed range, the ISG is used to apply a negative torque to slow the crankshaft and the engine is used primarily to increase the speed of rotation of the crankshaft, and the authority for shuffle reduction is shared between the engine and the ISG.

The third speed range is defined by the second speed threshold N2 as the lower boundary. Therefore, the third speed range encompasses engine speeds above approximately 3000 RPM. In the third speed range, the ISG can provide a low level of negative torque (the second relationship 204) but cannot provide any significant level of positive torque (the first relationship 202). Therefore, if N is greater than N2, the ISG will not be able to contribute significantly to the reduction of driveline shuffle but can provide a low level of negative torque to the crankshaft of the engine to help increase the efficiency of the engine, as operating the engine in a negative torque manner requires the combustion engine to be operated inefficiently. At such high rotational speeds (e.g., at engine speeds above N2), the ISG is unable to significantly contribute to the reduction of driveline shuffle, and so authority for shuffle reduction can be given to the engine in the third speed range.

The strategy described above is summarized in a table 400 shown in FIG. 4A. For example, a first column shows engine speed and a second column shows a control methodology that may be used by a controller (e.g., controller 20 of FIGS. 1A and 1B) to control the engine and the ISG to reduce driveline shuffle. A first row 402 shows that when the engine speed (N) is below the first speed threshold (N1), the controller employs a control methodology of using the ISG only for shuffle damping, such as by providing both positive and negative torque from the ISG to the crankshaft of the engine. Thus, the first row 402 describes operating in a first shuffle reduction mode. Positive torque is supplied to the crankshaft from the ISG when the controller determines (e.g., based on signals received from sensory inputs, such as the inputs 25 shown in FIGS. 1A and 1n particular Hall effect sensor 120 shown in FIG. 1B) that increasing the speed of the crankshaft would reduce driveline shuffle. Negative (braking) torque is supplied to the crankshaft from the ISG when the controller determines that decreasing the speed of the crankshaft would reduce driveline shuffle.

Figure 4A:
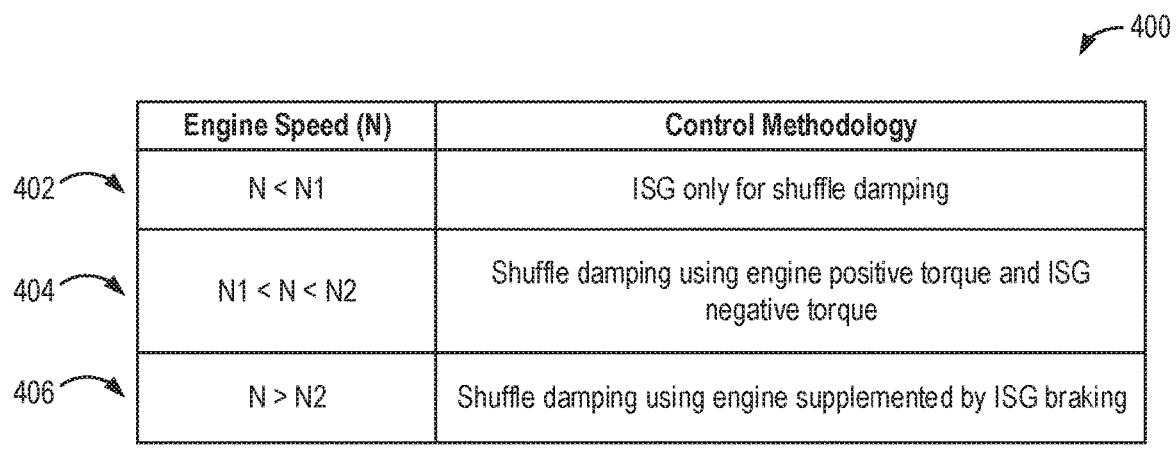
FIG. 4A is a table showing a first example of a control methodology used by an electronic controller forming part of the motor vehicle shown in FIG. 1 to reduce driveline shuffle.

Turning briefly to FIG. 3A, the effect of the control methodology of row 402 of FIG. 4A on driveline shuffle during a tip-in event is shown. For FIGS. 3A-3C, the vertical axis of each graph represents torque, with positive torque increasing in magnitude up the vertical axis from the origin and negative torque increasing in magnitude down the vertical axis from the origin. The horizontal axis of each graph represents time, with time increasing along the horizontal axis from left to right. Plot 302 represents driver demand (e.g., accelerator pedal depression), plot 304 represents a torque contribution from the engine, plot 306 represents a torque contribution from the ISG, and plot 308 represents a combined effect of the contributions from the engine and the ISG.

Specifically, an example graph 300 of FIG. 3A shows both positive and negative torque contributions made by the ISG (plot 306) to provide an idealized driveability/driveline control shown in plot 308. For example, the torque contribution of the engine (plot 304) is set to match the driver demand (plot 302), and the ISG is used for full-wave (addition and reduction) interventions to produce the combined torque shown in plot 308. In this way, the engine is not used for inefficient torque modulations, thereby increasing engine efficiency while operating in the first shuffle reduction mode. Further, the ISG provides a fast actuator response at low engine speeds (e.g., less than the first speed threshold N1 described above).

Returning to FIG. 4A, a second row 404 shows that when the engine speed (N) is above the first, lower speed threshold (N1) but below a second, higher speed threshold (N2), the controller employs a control methodology of using the ISG to provide negative torque to the crankshaft while using the engine to provide positive torque to the crankshaft to reduce driveline shuffle. Thus, the second row 404 describes operating in a second shuffle reduction mode. Positive torque is supplied to the crankshaft from the engine when the controller determines (e.g., based on signals received from the sensory inputs) that increasing the speed of the crankshaft would reduce driveline shuffle. Negative (braking) torque is supplied to the crankshaft from the ISG when the controller determines that decreasing the speed of the crankshaft would reduce driveline shuffle.

Turning briefly to FIG. 3B, the effect of the control methodology of row 404 of FIG. 4A on driveline shuffle during a tip-in event is shown. Specifically, an example graph 310 of FIG. 3B shows a positive torque contribution from the engine (plot 304) (e.g., increased above the driver demand shown in plot 302) and negative torque contributions from the ISG (plot 306) to provide the idealized driveability/driveline control shown in plot 308. For example, the ISG is used for half-wave (e.g., reduction) interventions to produce the combined torque shown in plot 308. In this way, the engine is not used for inefficient torque reductions, thereby increasing engine efficiency, while the ISG is not used for insignificant torque additions, thereby increasing drivability while operating in the second shuffle reduction mode.

Returning to FIG. 4A, a third row 406 shows that when the engine speed (N) is above the second, higher speed threshold (N2), the controller employs a control methodology of using the engine to provide shuffle damping with the engine supplemented by negative torque from the ISG (e.g., ISG braking). Thus, the third row 406 describes operating in a third shuffle reduction mode. For example, positive torque is supplied to the crankshaft from the engine when the controller determines (e.g., based on signals received from the sensory inputs) that increasing the speed of the crankshaft would reduce driveline shuffle, and negative torque is supplied to the crankshaft from the engine when the controller determines that decreasing the speed of the crankshaft would reduce driveline shuffle. The ISG is unable to effectively reduce driveline shuffle, but by providing some negative torque from the ISG to the crankshaft, the operating efficiency of the engine can be increased by reducing an amount of negative torque supplied from the engine.

Turning to FIG. 3C, the effect of the control methodology of row 406 of FIG. 4A on driveline shuffle during a tip-in event is shown. Specifically, an example graph 320 of FIG. 3C shows positive torque contributions and negative torque contributions (e.g., decreased below the driver demand shown in plot 302) from the engine (plot 304). A small negative torque contribution from the ISG (plot 306) supplements the negative torque contribution from the engine so that the negative torque contribution from the engine is reduced while the combined effect plot 308 still produces the idealized driveability/driveline control. For example, the ISG is used for half-wave (e.g., reduction) interventions. In this way, engine inefficiency is reduced while drivability is increased by operating in the third shuffle reduction mode.

Therefore, in summary, at lower engine speeds, the ISG has more torque authority and a faster actuation rate than the engine. The ISG also has the ability to add and subtract torque about a nominal combustion level delivered by the engine. In the present disclosure, it is therefore proposed that the ISG is used as an actuator to deliver fast driveability control interventions with full-wave around the nominal torque delivered by the engine at low engine speeds. The reduction in torque provided by the ISG can be achieved without retarding spark in the case of a spark ignited engine or operating the engine less efficiently, and so there is an efficiency gain for using the ISG to achieve this control. At higher engine speeds where the ISG may not be able to increase torque significantly but combustion torque increases can be achieved due to faster air system response, half-wave control of the ISG can be used that provides only a negative (braking) torque from the ISG. At very high engine speeds, the ISG is not able to increase or reduce torque significantly, and so authority reverts to the engine with the ISG operating so as to provide a low level of negative torque to reduce the overall inefficiency of the engine operation. It will be appreciated that authority will automatically revert to engine-only authority if there is no ISG authority due to, for example, an ISG fault or a low battery state of charge.

Figure 4B:
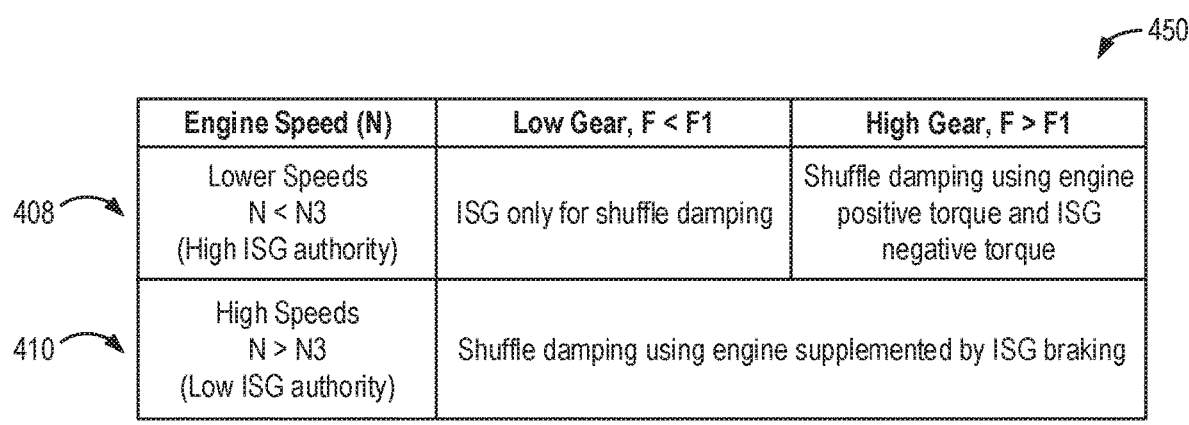
FIG. 4B is a table showing a second, alternative example of a control methodology used by the electronic controller forming part of the motor vehicle shown in FIG. 1 to reduce driveline shuffle.

Next, FIG. 4B shows an alternative control strategy in a table 450 that may be used by a controller (e.g., controller 20 of FIGS. 1A and 1B) to control an engine (e.g., engine 5 of FIGS. 1A and 1B) and an ISG (e.g., ISG 10 of FIGS. 1A and 1B) to reduce driveline shuffle. Unlike the control strategy summarized in table 400 of FIG. 4A, the alternative control strategy of table 450 includes control methodology for operating in different transmission gear ratios. For example, a first column shows engine speed, a second column shows a control methodology for operating in a low gear, and a third column shows a control methodology for operating in a high gear.

A first row 408 shows that when the engine speed (N) is below a third speed threshold (N3) and the transmission is in a low gear, the controller employs a control methodology of using the ISG only for shuffle damping, such as by providing both positive and negative torque from the ISG to the crankshaft of the engine. Thus, the first row 408 describes operating in the first shuffle reduction mode when the transmission is in the low gear. As before, positive torque is supplied to the crankshaft from the ISG when the controller determines (e.g., based on signals received from sensory inputs, such as the inputs 25 shown in FIGS. 1A and 1n particular Hall effect sensor 120 shown in FIG. 1B) that increasing the speed of the crankshaft would reduce driveline shuffle. Negative (braking) torque is supplied to the crankshaft from the ISG when the controller determines that decreasing the speed of the crankshaft would reduce driveline shuffle.

It will be appreciated that the gear (and thus gear ratio) selected in the transmission (e.g., transmission 6 of FIG. 1A)

will have an effect on the speed ratio and the torque ratio between the engine and the output from the transmission (e.g., the propeller shaft 7 shown in FIG. 1A). Therefore, the value of N3 will be set to a pre-determined value that gives ISG sufficient authority to reduce driveline shuffle and the resulting torque supplied from the transmission to counteract any driveline shuffle occurring when a lower gear is selected. For example, when in a lower gear, the frequency (F) of the driveline shuffle will be relatively low, and so the torque reversals between positive and negative torque supplied from the ISG will also be low. It will be appreciated that such torque reversals have a detrimental effect on the drive between the ISG and the engine, and so it is desirable to keep the frequency of such torque reversal below a predefined frequency threshold (F1). Therefore, the combination of an engine speed (N) less than the third speed threshold (N3) and the use of a low gear will ensure the predefined frequency threshold (F1) is not exceeded, thereby protecting the ISG drive from excessive wear. In one example, the third speed threshold (N3) is different than the first speed threshold (N1) and the second speed threshold (N2) described above. For example, the third speed threshold (N3) may be greater than the first speed threshold (N1) and less than the second speed threshold (N2). In other examples, the third speed threshold (N3) may be equal to one of the first speed threshold (N1) and the second speed threshold (N2).

The first row 408 also shows that when the rotational speed (N) of the crankshaft of the engine is below the third speed threshold (N3) but the transmission is in a higher gear, the controller employs a control methodology of shuffle damping using the engine for positive torque and the ISG for negative torque. Thus, the first row 408 describes operating in the second shuffle reduction mode when the transmission is in the higher gear. As before, positive torque is supplied to the crankshaft from the engine when the controller determines (e.g., based on signals received from the sensory inputs) that increasing the speed of the crankshaft would reduce driveline shuffle. Negative (braking) torque is supplied to the crankshaft from the ISG when the controller determines that decreasing the speed of the crankshaft would reduce driveline shuffle. This is because the higher gear will have the effect of increasing the frequency of the driveline shuffle, resulting in torque reversals at a frequency higher than the predefined frequency limit (F1). In order to protect the ISG drive from excessive wear, the controller is therefore configured to use the ISG to provide negative torque to the crankshaft when the transmission is operating in a high gear even while the engine speed is less than the third speed threshold, thereby eliminating the ISG torque reversals.

A second row 410 of table 450 of FIG. 4B shows that when the engine speed (N) is greater than the third speed threshold (N3), the controller employs a control methodology of using the engine to provide shuffle damping with the engine supplemented by negative torque from the ISG (e.g., ISG braking). Thus, the second row 410 describes operating in the third shuffle reduction mode. As before, positive torque is supplied to the crankshaft from the engine when the controller determines (e.g., based on signals received from the sensory inputs) that increasing the speed of the crankshaft would reduce driveline shuffle, and negative torque is supplied to the crankshaft from the engine when the controller determines that decreasing the speed of the crankshaft would reduce driveline shuffle. The ISG is unable to effectively reduce driveline shuffle, but by providing some negative torque from the ISG to the crankshaft, the operating efficiency of the engine can be increased by reducing an amount of negative torque supplied from the engine.

Referring now to FIG. 5, there is shown a first example method 500 for reducing driveline shuffle in a motor vehicle having an engine and an integrated starter-generator driven by a crankshaft of the engine. Method 500 of FIG. 5 corresponds to the control methodology summarized in table 400 of FIG. 4A above. Instructions for carrying out method 500 and the rest of the methods included herein may be executed by a controller (e.g., controller 20 of FIGS. 1A and 1B) based on instructions stored on a memory of the controller and in conjunction with signals received from sensors of the engine system, such as the sensors described above with reference to FIGS. 1A and 1B. The controller may employ actuators of the engine system to adjust operation (e.g., ISG 10 of FIG. 1A and spark plug 192 of FIG. 1B) according to the methods described below. As one example, method 500 is executed responsive to a key-on event, in which an ignition of the vehicle is switched to an "on" position and the vehicle is powered on, in order to efficiently control driveline shuffle. As another example, method 500 is executed responsive to an engine start event, in which the engine is cranked from rest and combustion is initiated in engine cylinders, which may coincide with the key-on event or may be different than the key-on event (e.g., when the vehicle is a hybrid vehicle).

At 505, method 500 includes estimating and/or measuring operating conditions. Operating conditions may include, for example, engine speed (N), a state of charge of a battery configured to supply electrical energy to the ISG (e.g., battery 11 shown in FIG. 1A), and a driver torque demand. As an example, the engine speed may be determined from a signal received from an engine speed sensor coupled to a crankshaft of the engine (e.g., from signal PIP received from Hall effect sensor 120 of FIG. 1B) and the driver torque demand may be determined from a signal received from an accelerator pedal position sensor (e.g., signal PP from pedal position sensor 134 shown in FIG. 1B). As another example, the state of charge may be calculated as a percentage charge available out of a total charge capacity of the battery.

At 510, method 500 includes determining whether the current engine speed (N) is less than a first, lower predefined speed threshold (N1), the first speed threshold described above with respect to FIG. 2. If the current engine speed is less than the first speed threshold, method 500 proceeds to 515 and includes using the ISG to provide full driveline shuffle control without using the engine for driveline shuffle control. For example, the ISG may provide full-wave shuffle control, supplying both positive and negative torque to the crankshaft for shuffle damping, as illustrated with respect to FIG. 3A. Thus, the controller selects the first shuffle reduction mode at 515 of method 500. Further, the controller may use the engine speed signal as feedback for adjusting an amount of the positive or negative torque provided by the ISG for driveline shuffle damping. As one example, as the engine speed increases above a target (e.g., set) speed for providing the driver torque demand, the controller may actuate the ISG to increase the amount of negative torque applied to the crankshaft. As another example, as the engine speed decreases below the target speed, the controller may actuate the ISG to increase the amount of positive torque applied to the crankshaft. In some examples, the controller may compare the current torque at the crankshaft to the driver torque demand and adjust the amount of positive or negative torque supplied by the ISG based on a difference between the current torque and the driver torque demand. In some examples, additionally or alternatively, the controller may be configured as a proportional-integral-derivative (PID) controller for closed-loop control of the torque at the crankshaft via the ISG. Method 500 may then proceed to 540, as will be described below.

Returning to 510, if the current engine speed is not less than the first speed threshold, method 500 proceeds to 520 and includes determining if the current engine speed (N) is less than a second, higher predefined speed threshold (N2), the second speed threshold described above with respect to FIG. 2. For example, if the current engine speed is less than the second speed threshold, it may be assumed that the current engine speed is in a range between the first speed threshold and the second speed threshold. If the current engine speed is less than the second speed threshold, method 500 proceeds to 525 and includes using the ISG for reduction shuffle control (e.g., by operating the ISG to provide negative torque to the crankshaft) and using the engine for additive shuffle control (e.g., by operating the engine to provide positive torque to the crankshaft above the driver demanded torque), as illustrated with respect to FIG. 3B. Thus, the controller selects the second shuffle reduction mode at 525. Further, the controller may use the engine speed signal as feedback for adjusting an amount of the positive torque provided by the engine or negative torque provided by the ISG for driveline shuffle damping. As one example, as the engine speed increases above the target speed, the controller may actuate the ISG to increase the amount of negative torque applied to the crankshaft. As another example, as the engine speed decreases below the target speed, the controller may command actuators of the engine to increase the amount of positive torque applied to the crankshaft. For example, the controller may increase airflow (and therefore fueling) to the engine (e.g., by further opening a throttle valve, such as throttle 162 of FIG. 1B) and/or advance spark timing (e.g., toward MBT) in order to increase the amount of positive torque applied to the crankshaft by the engine. In some examples, the controller may compare the current torque at the crankshaft to the driver torque demand and adjust the amount of positive torque supplied by the engine or negative torque supplied by the ISG based on a difference between the current torque and the driver torque demand. In some examples, additionally or alternatively, the controller may be configured as a PID controller for closed-loop control of the torque at the crankshaft via the ISG and the engine. Method 500 may then proceed to 540, as will be described below.

Returning to 520, if the current engine speed is not less than the second speed threshold, method 500 proceeds to 535 and includes using the engine for driveline shuffle control and supplementing the shuffle control with the ISG for reduction shuffle control only, as illustrated with respect to FIG. 3C. Thus, the controller selects the third shuffle reduction mode at 535. Further, the controller may use the engine speed signal as feedback for adjusting an amount of the positive or negative torque provided by the engine or negative torque provided by the ISG for driveline shuffle damping. As one example, as the engine speed increases above the target speed, the controller may command the engine actuators to provide a first portion of a total amount of negative torque to apply to the crankshaft and actuate the ISG to provide a second, remaining portion of the total amount of negative torque applied to the crankshaft. For example, the controller may decrease airflow to the engine and/or retard spark timing (e.g., from MBT) to increase the amount of negative torque supplied by the engine. As another example, as the engine speed decreases below the target speed, the controller may command the engine actuators to increase the amount of positive torque applied to the crankshaft, such as by increase airflow to the engine and/or advancing spark timing. In some examples, the controller may compare the current torque at the crankshaft to the driver torque demand and adjust the amount of positive torque supplied by the engine or negative torque supplied by the combination of the engine and the ISG based on a difference between the current torque and the driver torque demand. In some examples, additionally or alternatively, the controller may be configured as a PID controller for closed-loop control of the torque at the crankshaft via the ISG and the engine.

At 540, it is determined if a key-off event has occurred. The key-off event occurs when the ignition of the vehicle is switched to an "off" position and the vehicle is powered down. Alternatively at 540, it may be determined if an engine shutdown has been requested, during which combustion is discontinued in the engine cylinders and the engine is spun down to rest (e.g., an engine speed of zero). In some examples, the engine shutdown request may coincide with the key-off event. In other examples, such as when the vehicle is a hybrid vehicle, the engine shutdown request may occur while the vehicle remains keyed on.

If the key-off event (or engine shutdown request) has not occurred, method 500 returns to 505 to estimate and/or measure the operating conditions. In this way, the driveline shuffle control mode may be updated as the engine operating conditions, such as the engine speed, change. If the key-off event (or engine shutdown request) has occurred, method 500 proceeds to 550 and includes shutting down the engine. As described above, combustion may be discontinued in the engine, such as by stopping fuel delivery (e.g., via fuel injector 166 shown in FIG. 1B) and ignition (e.g., via spark plug 192 shown in FIG. 1B). Without the engine on and operating, driveline shuffle may not occur, and so method 500 ends.

Referring now to FIG. 6, there is shown there is shown a second example method 600 for reducing driveline shuffle in a motor vehicle having an engine and an integrated starter-generator driven by a crankshaft of the engine. Method 600 of FIG. 6 corresponds to the control methodology summarized in table 450 of FIG. 4B above. As one example, method 600 is executed responsive to a key-on event, in which an ignition of the vehicle is switched to an "on" position and the vehicle is powered on, in order to efficiently control driveline shuffle. As another example, method 600 is executed responsive to an engine start event, in which the engine is cranked from rest and combustion is initiated in engine cylinders, which may coincide with the key-on event or may be different than the key-on event (e.g., when the vehicle is a hybrid vehicle).

At 605, method 600 includes estimating and/or measuring operating conditions. Operating conditions may include, for example, engine speed (N), a selected transmission gear (e.g., of transmission 6 shown in FIG. 1A), a state of charge of a battery configured to supply electrical energy to the ISG (e.g., battery 11 shown in FIG. 1A), and a driver torque demand. As an example, the engine speed may be determined from a signal received from an engine speed sensor coupled to a crankshaft of the engine (e.g., from signal PIP received from Hall effect sensor 120 of FIG. 1B) and the driver torque demand may be determined from a signal received from an accelerator pedal position sensor (e.g., signal PP from pedal position sensor 134 shown in FIG. 1B). As another example, the state of charge may be calculated as a percentage charge available out of a total charge capacity of the battery.

At 610, method 600 includes determining whether the current engine speed (N) is less than a third predefined speed threshold (N3), the third speed threshold described above with respect to FIG. 4B, and a low gear is selected at the transmission. If the current engine speed is less than the first speed threshold and the low gear is selected, method 600 proceeds to 615 and includes using the ISG to provide full driveline shuffle control without using the engine for driveline shuffle control. For example, the ISG may provide full-wave shuffle control, supplying both positive and negative torque to the crankshaft for shuffle damping, as illustrated with respect to FIG. 3A. Thus, the controller selects the first shuffle reduction mode at 615 of method 600. Further, the controller may use the engine speed signal as feedback for adjusting an amount of the positive or negative torque provided by the ISG for driveline shuffle damping, as elaborated above at 515 of FIG. 5. Method 600 may then proceed to 640, as will be described below.

Returning to 610, if the current engine speed is not less than the third speed threshold and/or a low gear is not selected at the transmission, method 600 proceeds to 620 and includes determining if the current engine speed (N) is less than the third speed threshold (N3) and a high gear is selected at the transmission. If both the current engine speed is less than the third speed threshold and the high gear is selected, method 600 proceeds to 625 and includes using the ISG for reduction shuffle control (e.g., by operating the ISG to provide negative torque to the crankshaft) and using the engine for additive shuffle control (e.g., by operating the engine to provide positive torque to the crankshaft above the driver demanded torque), as illustrated with respect to FIG. 3B. Thus, the controller selects the second shuffle reduction mode at 625. Further, the controller may use the engine speed signal as feedback for adjusting an amount of the positive torque provided by the engine or negative torque provided by the ISG for driveline shuffle damping, as described above at 525 of FIG. 5. Method 600 may then proceed to 640, as will be described below.

Returning to 620, if the operating conditions do not include both the current engine speed being less than the third speed threshold (N3) and the high gear being selected at the transmission, it may be assumed that the current engine speed is not less than the third speed threshold, and method 600 proceeds to 635 and includes using the engine for driveline shuffle control and supplementing the shuffle control with the ISG for reduction shuffle control only, as illustrated with respect to FIG. 3C. Thus, the controller selects the third shuffle reduction mode at 635. Further, the controller may use the engine speed signal as feedback for adjusting an amount of the positive or negative torque provided by the engine or negative torque provided by the ISG for driveline shuffle damping, as described above at 535 of FIG. 5.

At 640, it is determined if a key-off event has occurred. The key-off event occurs when the ignition of the vehicle is switched to an "off" position and the vehicle is powered down. Alternatively at 640, it may be determined if an engine shutdown has been requested, during which combustion is discontinued in the engine cylinders and the engine is spun down to rest (e.g., an engine speed of zero). In some examples, the engine shutdown request may coincide with the key-off event. In other examples, such as when the vehicle is a hybrid vehicle, the engine shutdown request may occur while the vehicle remains keyed on.

If the key-off event (or engine shutdown request) has not occurred, method 600 returns to 605 to estimate and/or measure the operating conditions. In this way, the driveline shuffle control mode may be updated as the engine operating conditions, such as the engine speed, change. If the key-off event (or engine shutdown request) has occurred, method 600 proceeds to 650 and includes shutting down the engine. As described above, combustion may be discontinued in the engine, such as by stopping fuel delivery (e.g., via fuel injector 166 shown in FIG. 1B) and ignition (e.g., via spark plug 192 shown in FIG. 1B). Without the engine on and operating, driveline shuffle may not occur, and so method 600 ends.

Next, FIG. 7 shows an example timeline 700 for adjusting driveline shuffle control as engine operating conditions change. Specifically, timeline 700 shows how a controller (e.g., controller 20 shown in FIGS. 1A and 1B) may actuate an integrated starter-generator (e.g., ISG 10 of FIG. 1A) and the engine (e.g., engine 5 of FIGS. 1A and 1B) differently for driveline shuffle based on engine speed, such as according to the example method of FIG. 5. However, in other examples, the controller may adjust the driveline shuffle control based on engine speed and transmission gear, such according to the example method of FIG. 6.

In timeline 700, engine speed is shown in plot 702, engine torque usage for driveline shuffle reduction is shown in 704, ISG torque usage for driveline shuffle reduction is shown in plot 706, and an indication of a driveline shuffle reduction mode being used is shown in plot 708. For all of the above, the horizontal axis represents time, with time increasing along the horizontal axis from left to right. The vertical axis represents each labeled parameter. For plot 702, a magnitude of the engine speed increases along the vertical axis from bottom to top. For plot 704, the vertical axis indicates whether no engine torque is used for driveline shuffle reduction ("None"), only positive engine torque is used for driveline shuffle reduction ("Pos"), or both positive and negative engine torque are used for driveline shuffle reduction ("Pos and Neg"), as labeled. For plot 706, the vertical axis indicates whether both positive and negative ISG torque are used for driveline shuffle reduction ("Pos and Neg") or only negative ISG torque is used for driveline shuffle reduction ("Neg"), as labeled. For plot 708, the vertical axis indicates whether a first driveline shuffle reduction mode, a second driveline shuffle reduction mode, or a third driveline shuffle reduction mode is being used, as labeled. The different driveline shuffle reduction modes are described above with reference to FIGS. 3A-6.

At time t1, the engine is started from rest, such as in response to a key-on event. The engine is cranked to a speed (plot 702) that is less than a first speed threshold indicated by a dashed line 701. The first speed threshold corresponds to the first speed threshold N1 introduced in FIG. 2, for example. With the engine speed (plot 702) less than the first speed threshold (dashed line 701), the controller operates the ISG and the engine in the first driveline shuffle reduction mode (plot 708). While operating in the first driveline shuffle reduction mode, the ISG delivers both positive and negative torque to a crankshaft of the engine for shuffle damping (plot 706) while engine torque is not used for shuffle damping (plot 704), such as illustrated in graph 300 of FIG. 3A.

A tip-in event begins shortly before time t2, and the engine speed (plot 702) increases. At time t2, the engine speed (plot 702) surpasses the first speed threshold (dashed line 701) and remains below a second speed threshold represented by a dashed line 703. The second speed threshold corresponds to the second speed threshold N2 introduced in FIG. 2, for example. In response, the controller transitions to operating the ISG and the engine in the second driveline shuffle reduction mode (plot 708). While operating in the second driveline shuffle reduction mode, the ISG delivers only negative torque to the crankshaft for shuffle damping (plot 706) while engine delivers only positive torque to the crankshaft for shuffle damping (plot 704), such as illustrated in graph 310 of FIG. 3B.

The engine speed (plot 702) further increases shortly before time t3. At time t3, the engine speed (plot 702) surpasses the second speed threshold (dashed line 703), and in response, the controller transitions to operating the ISG and the engine in the third driveline shuffle reduction mode (plot 708). While operating in the third driveline shuffle reduction mode, the ISG delivers only negative torque to the crankshaft for shuffle damping (plot 706) while engine delivers both positive and negative torque to the crankshaft for shuffle damping (plot 704), such as illustrated in graph 320 of FIG. 3C. As described above with respect to FIGS. 3C, 4A, and 5, the negative torque supplied by the ISG may supplement the negative torque supplied by the engine so that the engine is not providing all of the negative torque for shuffle damping.

Shortly before time t4, a tip-out event occurs, and the engine speed (plot 702) begins to decrease. At time t4, the engine speed (plot 702) decreases below the second speed threshold (dashed line 703) but remains above the first speed threshold (dashed line 701). In response, the controller transitions back to operating the ISG and the engine in the second driveline shuffle reduction mode (plot 708), and the ISG delivers only negative torque to the crankshaft for shuffle damping (plot 706) while engine delivers only positive torque to the crankshaft for shuffle damping (plot 704).

At time t5, the engine speed again increases above the second speed threshold (dashed line 703). In response, the controller transitions back to operating the ISG and the engine in the third driveline shuffle reduction mode (plot 708), and the ISG delivers only negative torque to the crankshaft (plot 706) for supplementing the negative torque provided by the engine, which also delivers positive torque to the crankshaft for shuffle damping (plot 704).

At time t6, the engine speed (plot 702) again decreases below the second speed threshold (dashed line 703) and remains above the first speed threshold (dashed line 701). In response, the controller transitions to operating the ISG and the engine in the second driveline shuffle reduction mode (plot 708), and the ISG delivers only negative torque to the crankshaft for shuffle damping (plot 706) while engine delivers only positive torque to the crankshaft for shuffle damping (plot 704). For example, unlike the third shuffle reduction mode, the ISG delivers all of the negative torque for shuffle damping while operating in the second driveline shuffle reduction mode.

At time t7, the engine speed (plot 702) decreases below the first speed threshold (dashed line 701). In response, the controller transitions to operating the ISG and the engine in the first driveline shuffle reduction mode (plot 708), and only the ISG is used for reducing driveline shuffle, delivering both positive and negative torque to a crankshaft of the engine (plot 706). The controller continues to operate the ISG and the engine in the first driveline shuffle reduction mode (plot 708) until a key-off even occurs at time t8, and the engine is spun down to rest.

In this way, the integrated starter-generator and the engine are used as actuators to reduce driveline shuffle in the most effective manner by using the integrated starter-generator to fully reduce the driveline shuffle when it is the most effective actuator to achieve the desired result (e.g., at low engine speeds and/or when a low gear is selected at the transmission), to use a combination of engine positive control and negative speed reduction using the integrated starter-generator at higher engine speeds (or at low engine speeds when the a high gear is selected at the transmission), and to rely primarily on engine positive and negative speed control at highest engine speed levels where the integrated starter-generator is unable to make much contribution to speed control. The control strategies employed are therefore based primarily on the rotational speed of the engine and whether the integrated starter-generator or the engine is the best actuator to use at that speed. It will be appreciated that, ideally, shuffle will be reduced to zero, but in practice, a small amount of shuffle may remain. Overall, vehicle drivability is increased while fuel economy is increased by reducing an amount of inefficient engine operation used for driveline shuffle control.

The technical effect of using torque from an integrated starter-generator to reduce driveline shuffle at lower engine speeds instead of engine torque is that a fast response is achieved and engine efficiency is increased.

As one example, a system for a motor vehicle comprises: an engine driving a multi-speed transmission; an integrated starter-generator driveably connected to a crankshaft of the engine; and an electronic controller storing executable instructions in non-transitory memory, that, when executed, cause the electronic controller to: select a shuffle reduction mode from a plurality of shuffle reduction modes based at least partly on a rotational speed of the crankshaft of the engine; and operate the engine and the integrated starter-generator in the selected shuffle reduction mode. In the preceding example, additionally or optionally, the plurality of shuffle reduction modes includes a first shuffle reduction mode, a second shuffle reduction mode, and a third shuffle reduction mode. In one or both of the preceding examples, additionally or optionally, the instructions that cause the electronic controller to operate the engine and the integrated starter-generator in the selected shuffle reduction mode include further instructions stored in non-transitory memory that, when executed, cause the controller to use only the integrated starter-generator to reduce driveline shuffle when the first shuffle reduction mode is the selected shuffle reduction mode. In any or all of the preceding examples, additionally or optionally, the instructions that cause the electronic controller to use only the integrated starter-generator to reduce driveline shuffle when the first shuffle reduction mode is the selected shuffle reduction mode include further instructions stored in non-transitory memory that, when executed, cause the controller to: actuate the integrated starter-generator to apply a positive torque to the crankshaft of the engine in response to an indication to increase the rotational speed of the crankshaft to reduce driveline shuffle; and actuate the integrated starter-generator to apply a negative braking torque to the crankshaft of the engine in response to an indication to decrease the rotational speed of the crankshaft to reduce driveline shuffle. In any or all of the preceding examples, additionally or optionally, the instructions that cause the electronic controller to operate the engine and the integrated starter-generator in the selected shuffle reduction mode include further instructions stored in non-transitory memory, that, when executed, cause the controller to: actuate the engine and the integrated starter-generator in combination to reduce driveline shuffle when the second shuffle reduction mode is the selected shuffle reduction mode, the integrated starter-generator being actuated to reduce driveline shuffle by applying a negative braking torque to the crankshaft to reduce the rotational speed of the crankshaft and the engine being actuated to increase the rotational speed of the crankshaft. In any or all of the preceding examples, additionally or optionally, the instructions that cause the electronic controller to operate the engine and the integrated starter-generator in the selected shuffle reduction mode include further instructions stored in non-transitory memory that, when executed, cause the controller to: actuate the engine for increasing and reducing the rotational speed of the crankshaft to reduce driveline shuffle when the third shuffle reduction mode is the selected shuffle reduction mode; and actuate the integrated starter-generator to supplement the reducing the rotational speed of the crankshaft by the engine by applying additional negative braking torque to the crankshaft of the engine via the integrated starter-generator when the third shuffle reduction mode is the selected shuffle reduction mode. In any or all of the preceding examples, additionally or optionally, the instructions that cause the electronic controller to select the shuffle reduction mode from the plurality of shuffle reduction modes based at least partly on the rotational speed of the crankshaft of the engine include further instructions stored in non-transitory memory that, when executed, cause the controller to only select the first shuffle reduction mode when the rotational speed of the crankshaft is below a first predefined low speed threshold. In any or all of the preceding examples, additionally or optionally, the instructions that cause the electronic controller to select the shuffle reduction mode from the plurality of shuffle reduction modes based at least partly on the rotational speed of the crankshaft of the engine include further instructions in non-transitory memory that, when executed, cause the controller to select the second shuffle reduction mode when the rotational speed of the crankshaft is above the first predefined low speed threshold and below a second predefined higher speed threshold. In any or all of the preceding examples, additionally or optionally, the instructions that cause the electronic controller to select the shuffle reduction mode from the plurality of shuffle reduction modes based at least partly on the rotational speed of the crankshaft of the engine include further instructions in non-transitory memory that, when executed, cause the controller to select the third shuffle reduction mode when the rotational speed of the crankshaft is above the second predefined higher speed threshold. In any or all of the preceding examples, additionally or optionally, the instructions that cause the electronic controller to select the shuffle reduction mode from the plurality of shuffle reduction modes based at least partly on the rotational speed of the crankshaft of the engine include further instructions stored in non-transitory memory that, when executed, cause the controller to only select the first shuffle reduction mode when the rotational speed of the crankshaft is below a predefined speed threshold and a driveline shuffle frequency is below a predefined shuffle frequency threshold. In any or all of the preceding examples, additionally or optionally, the instructions that cause the electronic controller to select the shuffle reduction mode from the plurality of shuffle reduction modes based at least partly on the rotational speed of the crankshaft of the engine include further instructions stored in non-transitory memory that, when executed, cause the controller to select the second shuffle mode when the rotational speed of the crankshaft is below the predefined speed threshold and a shuffle frequency of the driveline is above the shuffle frequency threshold. In any or all of the preceding examples, additionally or optionally, the instructions that cause the electronic controller to select the shuffle reduction mode from the plurality of shuffle reduction modes based at least partly on the rotational speed of the crankshaft of the engine include further instructions stored in non-transitory memory that, when executed, cause the controller to select the third shuffle reduction mode when the rotational speed of the crankshaft is above the predefined speed threshold.

As another example, a method for reducing driveline oscillations in a vehicle comprises: selecting between a first shuffle reduction mode, a second shuffle reduction mode, and a third shuffle reduction mode based on at least a rotational speed of an engine of the vehicle; applying both positive torque and negative torque to a crankshaft of the engine via an integrated starter-generator (ISG) to reduce the driveline oscillations when the first shuffle reduction mode is selected, the ISG rotationally coupled to the crankshaft; applying positive torque to the crankshaft via the engine and negative torque to the crankshaft via the ISG to reduce the driveline oscillations when the second shuffle reduction mode is selected; and applying both positive torque and negative torque to the crankshaft via the engine to reduce the driveline oscillations when the third shuffle reduction mode is selected. In the preceding example, additionally or optionally, selecting between the first shuffle reduction mode, the second shuffle reduction mode, and the third shuffle reduction mode based on at least the rotational speed of the engine comprises: selecting the first shuffle reduction mode in response to the rotational speed of the engine being less than a first, lower threshold speed; selecting the second shuffle reduction mode in response to the rotational speed of the engine being greater than the first threshold speed and less than a second, higher threshold speed; and selecting the third shuffle reduction mode in response to the rotational speed on the engine being greater than the second threshold speed. In any or all of the preceding examples, additionally or optionally, selecting between the first shuffle reduction mode, the second shuffle reduction mode, and the third shuffle reduction mode based on at least the rotational speed of the engine comprises: selecting the first shuffle reduction mode in response to the rotational speed of the engine being less than a threshold speed and a driveline oscillation frequency being less than a shuffle frequency threshold; selecting the second shuffle reduction mode in response to the rotational speed of the engine being less than the threshold speed and the driveline oscillation frequency being greater than the shuffle frequency threshold; and selecting the third shuffle reduction mode in response to the rotational speed on the engine being greater than the threshold speed. In any or all of the preceding examples, additionally or optionally, the driveline oscillation frequency is dependent upon a selected gear in a multi-speed transmission driven by the engine, and wherein the driveline oscillation frequency is above the shuffle frequency threshold when the selected gear is a high gear. In any or all of the preceding examples, the method additionally or optionally further comprises supplementing the negative torque applied via the engine with additional negative torque applied via the ISG when the third shuffle reduction mode is selected.

As another example, a method comprises: applying negative torque to a crankshaft of an engine via a motor-generator in response to an indication to reduce driveline shuffle by decreasing a rotational speed of the crankshaft; and applying positive torque to the crankshaft via one of the motor-generator and the engine in response to an indication to reduce driveline shuffle by increasing the rotational speed of the crankshaft, the motor-generator or the engine selected based on engine speed. In the preceding example, additionally or optionally, the motor-generator is selected to apply positive torque to the crankshaft in response to the engine speed being less than a first threshold speed and the engine is selected to apply positive torque to the crankshaft in response to the engine speed being greater than the first threshold speed. In any or all of the preceding examples, additionally or optionally, applying negative torque to the crankshaft via the motor-generator in response to the indication to reduce driveline shuffle by decreasing the rotational speed of the crankshaft includes applying all of a total amount negative torque for decreasing the rotational speed of the crankshaft to a desired speed in response to the engine speed being less than a second threshold speed, greater than the first threshold speed, and applying a first portion of the total amount of negative torque via the engine and a second, remaining portion of the total amount of negative torque via the motor-generator in response to the engine speed being greater than the second threshold speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a motor vehicle, comprising:
    an engine driving a multi-speed transmission;
    an integrated starter-generator driveably connected to a crankshaft of the engine; and
    an electronic controller storing executable instructions in non-transitory memory, that, when executed, cause the electronic controller to:
        select a shuffle reduction mode from a plurality of shuffle reduction modes based at least partly on a rotational speed of the crankshaft of the engine, the plurality of shuffle reduction modes including a first shuffle reduction mode that utilizes only the integrated starter-generator to reduce driveline shuffle, a second shuffle reduction mode that utilizes the engine and the integrated starter-generator in combination to reduce driveline shuffle, and a third shuffle reduction mode that utilizes the engine supplemented by the integrated starter-generator to reduce driveline shuffle; and
        operate the engine and the integrated starter-generator in the selected shuffle reduction mode.

2. The system of claim 1, wherein the instructions that cause the electronic controller to operate the engine and the integrated starter-generator in the selected shuffle reduction mode include further instructions stored in non-transitory memory that, when executed when the first shuffle reduction mode is the selected shuffle reduction mode, cause the electronic controller to:
    actuate the integrated starter-generator to apply a positive torque to the crankshaft of the engine in response to an indication to increase the rotational speed of the crankshaft to reduce driveline shuffle; and
    actuate the integrated starter-generator to apply a negative braking torque to the crankshaft of the engine in response to an indication to decrease the rotational speed of the crankshaft to reduce driveline shuffle.

3. The system of claim 1, wherein the instructions that cause the electronic controller to operate the engine and the integrated starter-generator in the selected shuffle reduction mode include further instructions stored in non-transitory memory that, when executed when the second shuffle reduction mode is the selected shuffle reduction mode, cause the electronic controller to:
    actuate the integrated starter-generator to reduce driveline shuffle by applying a negative braking torque to the crankshaft to reduce the rotational speed of the crankshaft; and
    actuate the engine to reduce driveline shuffle by applying a positive torque to the crankshaft to increase the rotational speed of the crankshaft.

4. The system of claim 1, wherein the instructions that cause the electronic controller to operate the engine and the integrated starter-generator in the selected shuffle reduction mode include further instructions stored in non-transitory memory that, when executed when the third shuffle reduction mode is the selected shuffle reduction mode, cause the electronic controller to:
    actuate the engine for increasing and reducing the rotational speed of the crankshaft to reduce driveline shuffle; and
    actuate the integrated starter-generator to supplement the reducing the rotational speed of the crankshaft by the engine by applying additional negative braking torque to the crankshaft of the engine via the integrated starter-generator.

5. The system of claim 1, wherein the instructions that cause the electronic controller to select the shuffle reduction mode from the plurality of shuffle reduction modes based at least partly on the rotational speed of the crankshaft of the engine include further instructions stored in non-transitory memory that, when executed, cause the electronic controller to only select the first shuffle reduction mode when the rotational speed of the crankshaft is below a first predefined low speed threshold.

6. The system of claim 5, wherein the instructions that cause the electronic controller to select the shuffle reduction mode from the plurality of shuffle reduction modes based at least partly on the rotational speed of the crankshaft of the engine include further instructions in non-transitory memory that, when executed, cause the electronic controller to select the second shuffle reduction mode when the rotational speed of the crankshaft is above the first predefined low speed threshold and below a second predefined higher speed threshold.

7. The system of claim 6, wherein the instructions that cause the electronic controller to select the shuffle reduction mode from the plurality of shuffle reduction modes based at least partly on the rotational speed of the crankshaft of the engine include further instructions in non-transitory memory that, when executed, cause the electronic controller to select the third shuffle reduction mode when the rotational speed of the crankshaft is above the second predefined higher speed threshold.

8. The system of claim 1, wherein the instructions that cause the electronic controller to select the shuffle reduction mode from the plurality of shuffle reduction modes based at least partly on the rotational speed of the crankshaft of the engine include further instructions stored in non-transitory memory that, when executed, cause the electronic controller to only select the first shuffle reduction mode when the rotational speed of the crankshaft is below a predefined speed threshold and a driveline shuffle frequency is below a predefined shuffle frequency threshold.

9. The system of claim 8, wherein the instructions that cause the electronic controller to select the shuffle reduction mode from the plurality of shuffle reduction modes based at least partly on the rotational speed of the crankshaft of the engine include further instructions stored in non-transitory memory that, when executed, cause the electronic controller to select the second shuffle mode when the rotational speed of the crankshaft is below the predefined speed threshold and the driveline shuffle frequency is above the shuffle frequency threshold.

10. The system of claim 9, wherein the instructions that cause the electronic controller to select the shuffle reduction mode from the plurality of shuffle reduction modes based at least partly on the rotational speed of the crankshaft of the engine include further instructions stored in non-transitory memory that, when executed, cause the electronic controller to select the third shuffle reduction mode when the rotational speed of the crankshaft is above the predefined speed threshold.

11. A method for reducing driveline oscillations in a vehicle, comprising:
    selecting between a first shuffle reduction mode, a second shuffle reduction mode, and a third shuffle reduction mode based on at least a rotational speed of an engine of the vehicle;
    applying both positive torque and negative torque to a crankshaft of the engine via an integrated starter-generator (ISG) to reduce the driveline oscillations when the first shuffle reduction mode is selected, the ISG rotationally coupled to the crankshaft;
    applying positive torque to the crankshaft via the engine and negative torque to the crankshaft via the ISG to reduce the driveline oscillations when the second shuffle reduction mode is selected; and
    applying both positive torque and negative torque to the crankshaft via the engine to reduce the driveline oscillations when the third shuffle reduction mode is selected.

12. The method of claim 11, wherein selecting between the first shuffle reduction mode, the second shuffle reduction mode, and the third shuffle reduction mode based on at least the rotational speed of the engine comprises:
    selecting the first shuffle reduction mode in response to the rotational speed of the engine being less than a first, lower threshold speed;
    selecting the second shuffle reduction mode in response to the rotational speed of the engine being greater than the first threshold speed and less than a second, higher threshold speed; and
    selecting the third shuffle reduction mode in response to the rotational speed on the engine being greater than the second threshold speed.

13. The method of claim 11, wherein selecting between the first shuffle reduction mode, the second shuffle reduction mode, and the third shuffle reduction mode based on at least the rotational speed of the engine comprises:
    selecting the first shuffle reduction mode in response to the rotational speed of the engine being less than a threshold speed and a driveline oscillation frequency being less than a shuffle frequency threshold;
    selecting the second shuffle reduction mode in response to the rotational speed of the engine being less than the threshold speed and the driveline oscillation frequency being greater than the shuffle frequency threshold; and
    selecting the third shuffle reduction mode in response to the rotational speed on the engine being greater than the threshold speed.

14. The method of claim 13, wherein the driveline oscillation frequency is dependent upon a selected gear in a multi-speed transmission driven by the engine, and wherein the driveline oscillation frequency is above the shuffle frequency threshold when the selected gear is a high gear.

15. The method of claim 11, further comprising supplementing the negative torque applied via the engine with additional negative torque applied via the ISG when the third shuffle reduction mode is selected.

16. A method, comprising:
    applying negative torque to a crankshaft of an engine via a motor-generator in response to an indication to reduce driveline shuffle by decreasing a rotational speed of the crankshaft; and
    applying positive torque to the crankshaft via one of the motor-generator and the engine in response to the indication to reduce driveline shuffle by increasing the rotational speed of the crankshaft, the motor-generator selected responsive to a speed of the engine being less than a first threshold speed and the engine selected responsive to the speed of the engine being greater than the first threshold speed.

17. The method of claim 16, wherein applying negative torque to the crankshaft via the motor-generator in response to the indication to reduce driveline shuffle by decreasing the rotational speed of the crankshaft includes:
    applying all of a total amount negative torque for decreasing the rotational speed of the crankshaft to a desired speed in response to the speed of the engine being less than a second threshold speed, greater than the first threshold speed; and applying a first portion of the total amount of negative torque via the engine and a second, remaining portion of the total amount of negative torque via the motor-generator in response to the speed of the engine being greater than the second threshold speed.

\* \* \* \* \*